(No Model.)
W. O. COLEMAN.
COTTON GIN FEEDER.
No. 278,402. Patented May 29, 1883.
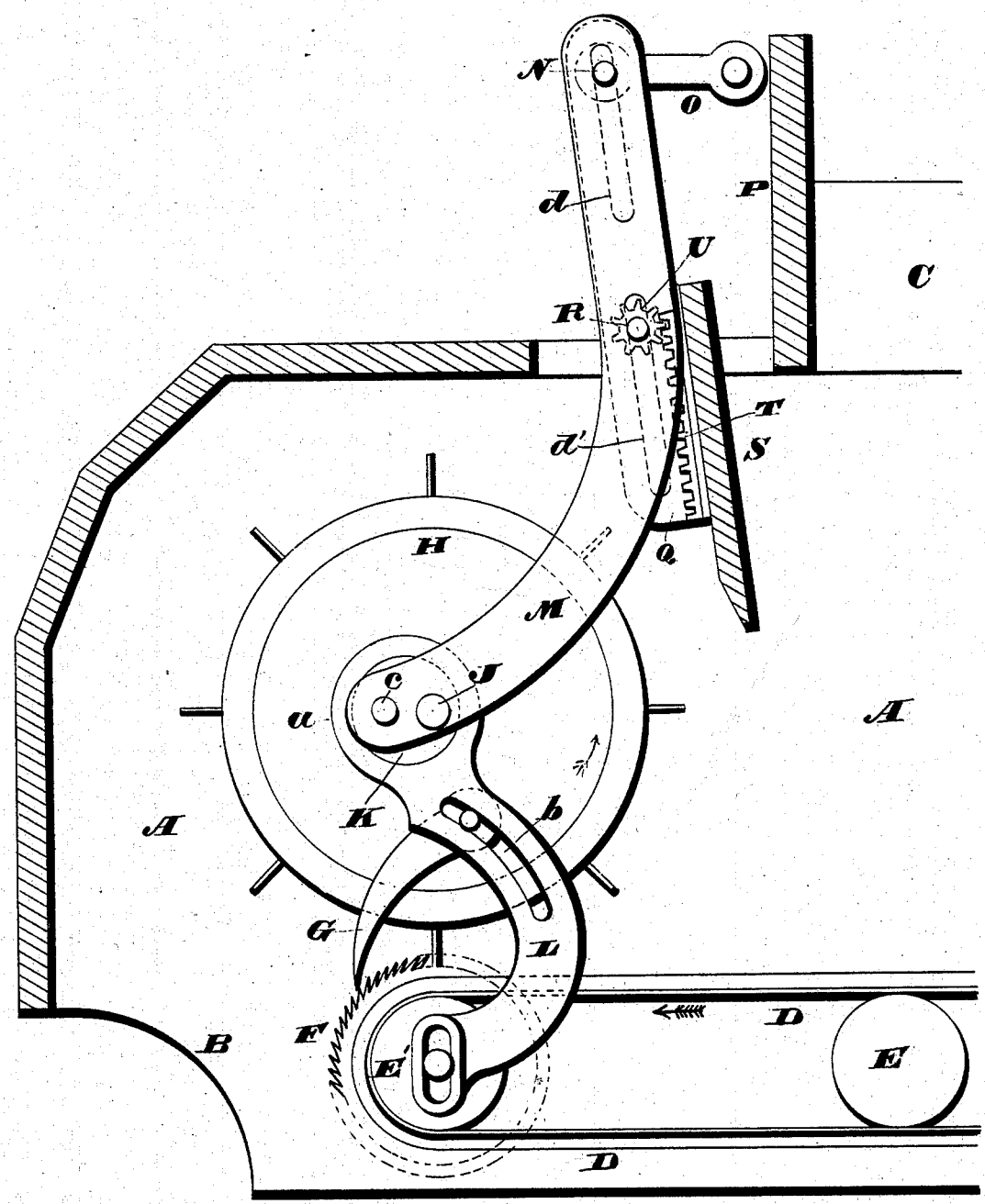
WITNESSES
INVENTOR
Wm O Coleman
Attorney

UNITED STATES PATENT OFFICE.

WILLIAM O. COLEMAN, OF LITTLE ROCK, ARKANSAS, ASSIGNOR OF ONE-HALF TO S. Z. HALL SOUTHERN COTTON GIN COMPANY.

COTTON-GIN FEEDER.

SPECIFICATION forming part of Letters Patent No. 278,402, dated May 29, 1883.

Application filed December 6, 1882. (No model.)

*To all whom it may concern:*

Be it known that I, WILLIAM O. COLEMAN, of Little Rock, in the county of Pulaski and State of Arkansas, have invented certain new and useful Improvements in Cotton-Gin Feeders; and I do hereby declare the following to be a full, clear, and exact description of the invention, such as will enable others skilled in the art to which it pertains to make and use the same.

My invention relates to an improvement in feeders for cotton-gins, the object of the same being to provide a device of this character which will combine simplicity and economy of construction with durability and efficiency in use; and with these ends in view my invention consists in the parts and combinations of parts, as will be more fully explained, and pointed out in the claims.

The accompanying drawing represents my invention in longitudinal vertical section.

A represents the feeder-case, provided with a discharge-opening, B, and a hopper, C, through which the cotton is introduced into the feeder. The cotton as it is fed into the hopper falls onto the endless carrier D, which latter is supported and moves on and around the wheels, rollers, or cylinders E E'. The roller or cylinder E', situated near the discharge-opening B, is provided on one or both ends (preferably both) with the ratchet wheel or wheels F, with which one or more dogs, G, engage and intermittingly impart a movement to the roller E', and also to the carrier D, which latter passes around the said roller. When only one ratchet-wheel is employed on the roller E' only one dog would be necessary, but when two ratchet-wheels are used two dogs would be required; but as the operation of both would be alike it will be only necessary to refer to one.

H is the feed-cylinder, of any desired size and construction, provided at suitable intervals apart with teeth adapted to take up the cotton as it is brought forward, carry it around in the direction of the arrow over the cylinder, and finally discharge it through the opening B into the ginning-machine in a continuous and even flow, which, however, is regulated to suit the size and capacity of the gin. The cylinder H is mounted on the shaft J, which is journaled in suitable bearings in the side of the frame. This shaft J is provided near both ends with eccentrics K, which are adapted to operate the rake and dog or dogs, as the case may be.

L is a curved lever, (if two dogs are employed two levers L are also employed,) the upper end of which is provided with a collar, *a*, adapted to surround the eccentric K and receive its motion therefrom, while the lower end thereof is provided with an oblong slot, through which the shaft of the roller E' passes, and by which it is retained in position. This curved lever L is provided with an arc-shaped slot, *b*, in which the dog G is adjustably secured by screw bolt and nut. The dog is adjusted up and down in the slot *b* to vary the speed of the endless carrier D. When it is desired to feed rapidly the dog G is secured to the lever, near the upper one of the slot *b*, as that portion of the lever moves over a greater space than the portion of the lever at the lower end of the slot, and as a consequence enables the dog to take in more teeth of the ratchet F at one movement. When the dog is secured to the lever L near the lower end of the slot the movement of the lever is less pronounced and the feed of the endless apron slowed or lessened in proportion.

When the feed-cylinder H is revolved the eccentric K revolves with it, and in turn moves the pivoted end of the dog around in a circle. As the dog is simply pivoted to the lever L, the lower end of the dog at all times rests on the ratchet, and is simply moved forward and backward thereon. In its forward movement it engages with the ratchet and partly turns it, and on its return it simply moves over it without engaging therewith, the lever being held against displacement by the shaft of the roller E', passing through an oblong slot in its lower end.

From the foregoing it will be seen that the rapidity of movement of the endless carrier is dependent upon and in proportion to the speed of the cylinder H.

*c* are crank-pins secured to the eccentrics, which are on the opposite ends of the shaft J, and adapted to operate the rake, as will be hereinafter described. The lower ends of the two rake-arms M—one on each end of the cylinder H—are journaled on the crank-pins $c$, while the upper ends of the said arms are held in position by the bar N, which latter in turn is supported at its ends by the links O. These links O are connected at their opposite ends by staples or other suitable means to the hopper-board P or other suitable supports, and are adapted to hold and guide the upper ends of the rake-arms M when the machine is in motion. Thus it will be seen that while the lower ends of the arms M, which are attached to the crank-pins $c$, move around in a circle, the upper ends thereof, which are attached to the rods N, move in the arc of a circle.

Q are the rake-standards, situated alongside of the rake-arms M and provided with the oblong slots $d\ d'$, through which the rods N R respectively pass. The rake-board S is rigidly secured to these rake-standards, and is provided with one or more (preferably two) rack-bars, T, situated in close proximity to the rake-standards. The bar R is provided with pinions U, which engage with these rack-bars for the purpose of elevating and depressing the rake-board as necessity demands. The amount of adjustment of the rake-board is dependent on the length of the slots $d\ d'$. By turning the rod R in the proper direction the rake standards and board can be elevated or raised up a distance equal to the length of the slots, and the amount of cotton passing over the cylinder H is dependent on the position of the rake-board. The shaft or rod R can be operated by a worm-gear, which will effectually hold the board S in position against accidental displacement, or an ordinary crank can be employed for turning the rod, and a gravity or spring-actuated dog or pawl, situated below the pinion for holding the board in proper position, and answer all the necessary purposes. The board S is situated in front of the cylinder H, with sufficient space between them for the passage of the cotton. This space is increased and an increased amount of cotton allowed to pass over the cylinder H when the board S is elevated, and the space and amount of cotton passing out proportionately decreased as the board is lowered. As the cotton is brought forward by the endless carrier, the rake-board forms a shield for the upper portion of the cylinder H and causes the cotton to engage with the said cylinder below the board. The arms, eccentrics, and links described give the rake a curved upward movement while moving away from the cylinder H, which movement forces the cotton in front of the board away from the cylinder H. The rake then moves downward in a curved direction away from the cotton, and then upward and against the cotton, and again forces it away from the cylinder, and so on continuously, thereby preventing more than the predetermined amount from passing over at each revolution, and also preventing the cotton from clogging behind the rake-board. As the rake and endless carrier are operated by the cylinder H, it follows that as the speed of the cylinder is increased the speed of the other parts is also proportionately increased.

This device is adapted to be placed on top or alongside of a cotton-gin and deliver the cotton thereto in any desired quantity, which, as before stated, is dependent on the capacity of the gin. If desired, I can dispense with the links O and rigidly secure the rod N in position on top of the case A. In this latter instance the rake-arms would be provided with oblong slots to enable them to move on the rod N.

It is evident that numerous changes in the construction and relative arrangement of the several parts might be resorted to without departing from the spirit of my invention, and hence I would have it understood that I do not limit myself to the exact construction shown and described, but consider myself at liberty to make such changes and alterations as fairly fall within the spirit and scope of my invention.

Having fully described my invention, what I claim as new, and desire to secure by Letters Patent, is—

1. In a feeder for cotton-gins, the combination, with a carrier and feed-cylinder, of rake-arms connected at one end to the shaft of the feed-cylinder, and a rake-board operated by the said arms.

2. In a feeder for cotton-gins, the combination, with an endless carrier, a feeding-cylinder, and means for moving the said endless carrier, of rake-arms connected at their lower ends to crank-pins on the feed-wheel shaft, a rod passing through the upper ends of the arms, links connecting the rod to the hopper-board, and a rake-board indirectly connected to the rake-arms, as described.

3. The combination, with a carrier and feeding-cylinder, the shaft of which is provided with crank-pins, of the rake-arms connected to the crank-pins, means of holding and guiding the rake-arms, a rake board and standard, and means for elevating and lowering and holding the rake-board in any desired vertical adjustment.

4. The combination, with the feed-cylinder, cylinder-shaft, eccentrics, crank-pins, rake-arms, rod N, and links, of the rake-board, standards provided with the oblong slots, the rack-bars, rod R, pinion U, and mechanism for turning the said latter rod.

5. The combination, with an endless carrier supported on rollers, one of which is provided on opposite ends with ratchet-wheels, of the feed-cylinder and cylinder-shaft, a rake operated by an eccentric on the cylinder-shaft, and a dog operated by the cylinder-shaft and adapted to intermittingly move the endless carrier.

6. The combination, with the endless carrier, ratchet-wheel, and feed-cylinder, the shaft of which is provided with an eccentric, of a lever provided at its upper end with a collar adapted to surround the eccentric, and provided at its lower end with an oblong slot, by means of which it is guided and held in position, and a dog pivoted to the lever and adapted to engage the ratchet-wheel and move the endless carrier.

7. The combination, with the endless carrier, ratchet-wheels, feed-cylinder, and feed-cylinder shaft provided with an eccentric, of the curved lever L, having the collar $a$ at its upper end and an oblong slot at its lower end, for the purpose set forth, and a dog adjustably secured to the said lever for the purpose of increasing or decreasing the speed of the endless carrier.

In testimony whereof I have signed this specification in the presence of two subscribing witnesses.

WILLIAM ORSBERN COLEMAN.

Witnesses:
W. A. BRIGHT,
E. E. HUDSPETH.